United States Patent [19]

Stewart et al.

[11] 4,065,751
[45] Dec. 27, 1977

[54] WARNING CIRCUIT FOR A TRACTOR/TRAILER COMBINATION

[75] Inventors: John A. Stewart, Flint; Roy G. Hynes, Flushing; David G. Beyerlein, Flint; John B. Force, Bancroft, all of Mich.

[73] Assignee: General Motors Corporation, Detroit, Mich.

[21] Appl. No.: 733,347

[22] Filed: Oct. 18, 1976

[51] Int. Cl.$^2$ .............................................. B60C 23/02
[52] U.S. Cl. ..................................... 340/58; 307/10 R
[58] Field of Search ............... 340/52 F, 52 R, 53, 340/58; 180/103; 307/10 R

[56] References Cited

U.S. PATENT DOCUMENTS

| 3,215,978 | 11/1965 | Brown et al. | 340/58 |
| 3,872,424 | 3/1975 | Enabnit | 340/52 F |

Primary Examiner—Alvin H. Waring
Attorney, Agent, or Firm—Warren D. Hill

[57] ABSTRACT

A circuit is provided for a tractor/trailer combination to provide a warning in the tractor of an event such as low tire pressure occurring at the trailer utilizing only conventional wiring connections between the tractor and trailer. When low tire pressure occurs, a flasher circuit on the trailer flashes the trailer marker lamps which are normally energized so that the flashing lamps are visible to the operator. The electrical pulses in the marker lamp circuits are sensed by a detector in the tractor to illuminate an indicator lamp in the tractor.

3 Claims, 3 Drawing Figures

WARNING CIRCUIT FOR A TRACTOR/TRAILER COMBINATION

This invention relates to a warning circuit for a tractor/trailer combination and particularly to such a circuit for indicating in the tractor an event occurring in the trailer.

It has been proposed to provide vehicles with low tire inflation pressure warning devices which provide an event signal from a sensor adjacent a vehicle wheel and to electrically transmit a warning signal to illuminate an indicator lamp in view of the vehicle operator. Such a system is shown in the United States patent to Lorenz et al. U.S. Pat. No. 3,977,355. Where the system is applied to the tire of a tractor/trailer combination, the warning circuit would ordinarily reqire special electrical connection between the tractor and trailer and in particular would require additional wires. It is customary, however, to use a standard seven wire connector between tractors and trailers so that a tractor may be used with any trailer and be electrically compatible. It is therefore desirable to employ a warning system which does not interfere with the standard wiring interconnection practice. In addition, since a trailer equipped with a warning circuit may not necessarily always be used with a tractor equipped with companion circuitry for indicating a low tire pressure, it is desirable that a telltale warning be given independently of the tractor circuit.

It is therefore an object of the invention to provide a warning circuit for a tractor/trailer combination using the standard electrical interconnection scheme which electrically indicates in the tractor an event occurring in the trailer.

Another object of the invention is to provide in such a warning circuit a trailer warning signal independent of signal detection circuitry in the tractor.

The invention is carried out by providing in the trailer a warning circuit responsive to an event such as low tire pressure for activating a flasher circuit which in turn flashes standard trailer signal lights, and providing a pulse detector in the tractor which senses corresponding pulses in the signal light supply circuit and causes corresponding flashing of an indicator lamp.

The above and other advantages will be made more apparent from the following specification taken in conjunction with the accompanying drawings wherein like reference numerals refer to like parts and wherein.

Figure 1:
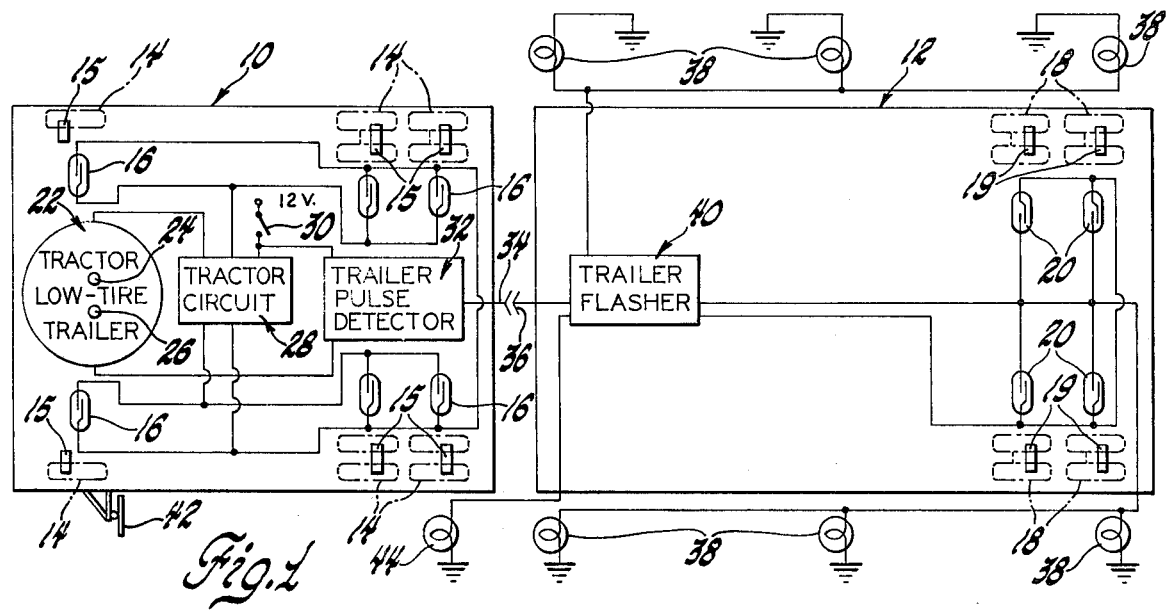
FIG. 1 is a block diagram of a warning circuit for a tractor/trailer combination according to the invention.

Referring to FIG. 1, the full line blocks 10 and 12 depict a tractor and a trailer respectively. The tractor wheels 14 have associated therewith low tire pressure sensors 15 magnetically coupled with reed switches 16. While the complete pressure warning device for each tire involves more than a reed switch, the reed switch does form the sensor portion on the vehicle body. The above mentioned patent to Lorenz et al. provides the details of the low pressure warning sensors 15. The trailer wheels 18 are monitored by the sensors 19 and the reed switches 20. A display panel 22 in the tractor contains indicator lamps 24 and 26 for the tractor and trailer respectively. A tractor circuit 28 connected to the reed switches 16 sense closure of any of the switches and causes flashing illumination of the indicator lamp 24. A switch 30 supplies electrical power from a battery to the tractor circuit 28. A trailer pulse detector circuit 32 also receives electrical power through the switch 30 and transmits that power through a conductor 34 by way of a connector 36 to the marker light circuit of the trailer.

For the system to be operable, the switch 30 must be closed to turn on the marker lights 38 during daytime as well as night time driving. The lamps 38 are connected to the conductor 34 through a trailer flasher 40. The flasher 40 monitors the condition of the reed switches 20 and when any switch is closed, causes flashing of the marker lamps, which flashing is visible to the vehicle operator through a rear view mirror 42. If desired, an optional high intensity lamp 44, directed toward the mirror 42 may be connected to and activated by the flasher. To provide a flashing indication within the tractor, however, the trailer pulse detector 32 monitors the current flowing in line 34 and when pulsation occurs due to the flasher, the pulse detector produces corresponding flashing illumination of the indicator lamp 26. To insure strong, easily detected flasher pulses, the flash rate is held to a low value so the lamps will cool between "on" periods and will draw a large spike of current when turned on.

Figure 2:
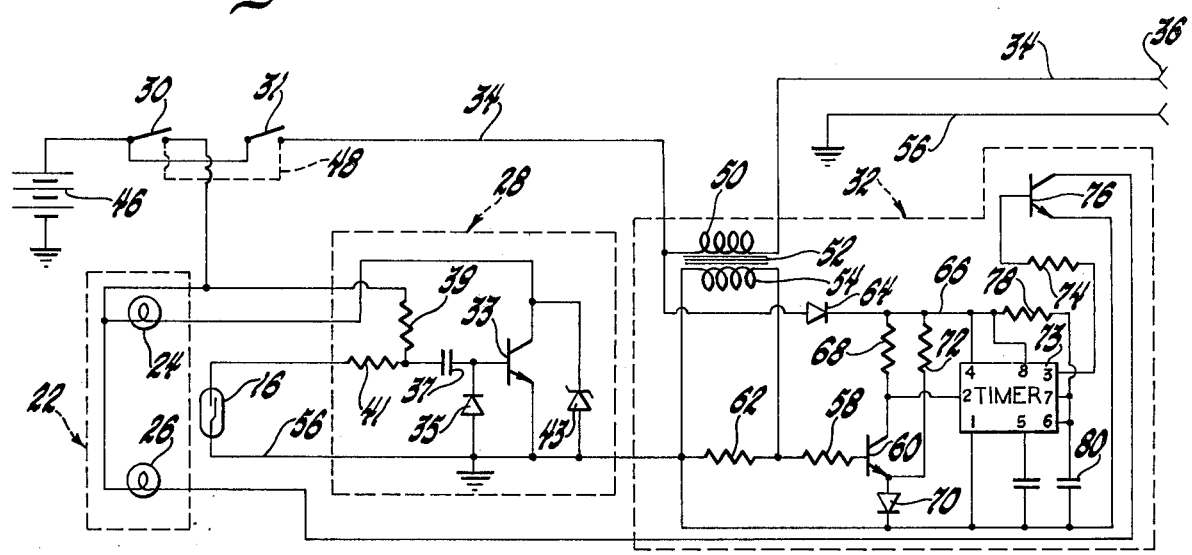
FIG. 2 is a schematic drawing of the tractor portion of the circuit of FIG. 1.

FIG. 2 shows schematically the circuitry carried by the tractor. A battery 46 is connected to one contact of an ignition switch 30 and a marker switch 31. The ignition switch, when closed, supplies voltage to one side of the indicator lamps 24 and 26 of the display 22 as well as to the tractor circuit 28. Tractor circuit 28 includes a transistor 33 having its collector connected to one side of the tractor indicator lamp 24 and its emitter connected to the chassis ground line 56. The base of the transistor is connected to ground through a diode 35 as well as through a capacitor 37 and a resistor 39 to the ignition switch 30. The junction of the resistor 39 and capacitor 37 is connected through a resistor 41 and reed switch 16 to ground. The single reed switch shown in FIG. 2 represents all the parallel-connected reed switches 16 of FIG. 1. A zener diode 43 is connected across the emitter and collector of the transistor 33.

In operation when the ignition switch is first closed, a current pulse passes through the resistor 39 to charge the capacitor 37 and momentarily turn on the transistor 33 which provides a ground path for the indicator lamp 24 causing the lamp to flash. This is a self-check function to verify circuit operability. Whenever a low tire pressure occurs, the reed switch 16 will open and close once for each tire revolution. When switch 16 closes, the capacitor 37 discharges through the resistor 41, switch 16 and diode 35. Then when the switch 16 opens, the capacitor 37 charges to momentarily turn on the indicator lamp 24. Accordingly, the lamp 24 will flash once each tire revolution when the low pressure detector triggers the switch 16.

The marker switch 31, when closed, supplies voltage to the conductor 34. The trailer warning circuit is operable only when the conductor 34 is energized, therefore, an alternative wiring scheme as shown by the dotted line 48 connects the conductor 34 directly to the ignition switch 30 so that the system is energized whenever the ignition switch is closed. The provision of the separate marker switch 31 allows manual interruption of the marker circuit for signalling purposes. The conductor 34 includes the primary winding 50 of pulse transformer 52 in the trailer pulse detector 32. The secondary winding 54 is connected between a chassis ground line 56 and a resistor 58 leading to the base of a transistor 60. A resistor 62 is placed across the winding 54. The conductor 34 is connected through a diode 64 to a line 66 which is connected through a resistor 68 to the collector of the transistor 60 and the emitter is connected through a diode 70 to the ground line 56. A resistor 72 is connected between the lines 66 and the emitter of the transistor 60. An integrated circuit comprising a 555 timer 73 is connected into the circuit as a one shot multivibrator and, in addition to power connections, includes an input connected to the collector of the transistor 60 and an output line connected through a resistor 74 to the base of a transistor 76. A resistor 78 and a capacitor 80 are serially connected between lines 66 and ground and their junction point provides a bias signal to the timer 73. The transistor 76 has a grounded emitter and its collector is connected to one side of the trailer indicator lamp 26 so that the lamp is illuminated whenever the transistor 76 is conductive.

In operation, it is the propose of the trailer pulse detector circuit to detect large current spikes generated by the flashing of the marker lamps during a warning indication and to simultaneously flash the indicator lamp 26. The primary winding 50 of the transformer preferably contains four turns while the secondary has 400 turns to transform the current pulses to a usable voltage level for the sensing circuit. The resistors 62 and 58 serve as a voltage divider which is set at a level to turn on the transistor 60 by the large voltage pulses while being insensitive to other spikes and noise present on the conductor 34. Thus provision is made to insure large spikes due to the flashing marker lamps thereby facilitating detection of the current spikes. The resistor 72 and diode 70 comprise a bias network to set and stabilize the switch point of the transistor 60. When the transistor 60 turns on, the collector voltage is lowered sufficiently to trigger the timer 73. The resistor 78 and the capacitor 80 are chosen to give an approximate 50% duty cycle at the trailer flash rate. Thus each flash of the marker lamps momentarily turns on the transistor 60 which triggers the timer or one shot multivibrator 73 for a fixed interval to turn on the transistor 76 and illuminate the indicator lamp 26. The diode 64 isolates the circuit from negative spikes on the conductor 34.

Figure 3:
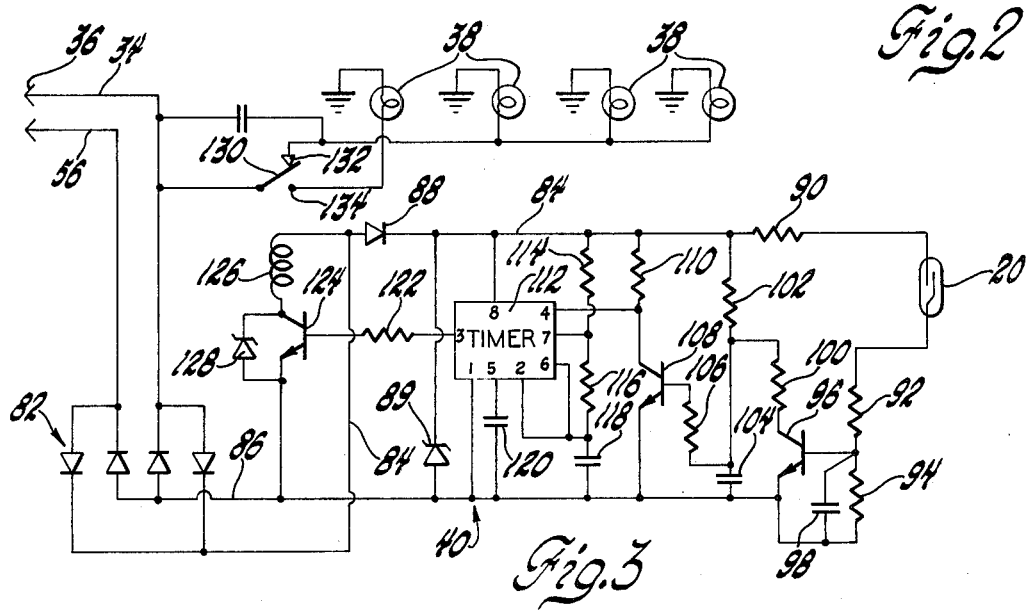
FIG. 3 is a schematic drawing of the trailer portion of the circuit of FIG. 1.

FIG. 3 schematically shows the circuit carried by the trailer. The conductor 34 and the chassis ground line 56 are both passing through the tractor/trailer connector 36 and are connected to a diode bridge 82 which provides on line 84 a positive voltage with respect to an isolated ground line 86 irrespective of whether the tractor battery 46 has positive or negative ground. In this wa, the ensuing circuit is compatible with a tractor circuit of either polarity. Zener diode 89 is connected across the lines 84 and 86 for spike suppression purposes. The line 84 which includes a diode 88 supplies power to a flasher circuit. A resistor 90, the reed switch 20, a resistor 92 and a resistor 94 are serially connected between the line 84 and the ground line 86. The reed switch 20 represents all the reed switches of FIG. 1. The junction point of the resistors 92 and 94 is connected to the base of a transistor 96 which base is also connected to ground through a capacitor 98. The transistor's emitter is grounded and its collector is connected through resistors 100 and 102 to line 84. The junction of the resistors 100 and 102 is connected to ground through timing capacitor 104 and further is connected through a resistor 106 to the base of a transistor 108. That transistor has a grounded emitter and a collector connected through a resistor 110 to line 84. The collector of the transistor 108 is also connected to the input terminal of a 555 timer 112 which is connected as an astable multivibrator or flasher. Resistors 114 and 116 and capacitor 118 are serially connected between the lines 84 and 86 and the resistor junctions are connected to a terminal of timer 112 to control the timing rate of the multivibrator which sets the duty cycle. By-pass capacitor 120 connects the timer to the ground line 86. The output of the timer 112 is applied through resistor 122 to the base of transistor 124. The transistor has a grounded emitter and a collector connected through the coil 126 of a relay to the line 84. A zener diode 128 across the emitter and collector of the transistor 128 protects the transistor from negative spikes as well as large positive spikes from the relay coil 126. A movable contact 130 of the relay is connected to the conductor 34 and is normally closed against stationary contact 132 which is connected to the marker lamps 38. An auxiliary contact 134 which is engaged by the contact 130 when the relay is energized connects the optional lamp 44 to the conductor 34.

In operation, the 555 timer 112 serves as an astable multivibrator when the collector of the transistor 108 is at a high voltage to provide a pulsating output through resistor 122 of approximately 50% duty cycle to affect flashing of the marker lamps 38 and lamp 44 by periodically energizing the transistor 124 and relay coil 126. When, however, the collector of the transistor 128 is at a low potential, there is no timer output current through resistor 122. When the switch 31 is first closed to apply power to line 34, positive voltage is applied to line 84. Then the collector of transistor 108 will assume a high voltage to cause multivibrator operation and flashing of the marker lamps. Thus the circuit is tested each time when the system is turned on. After the turn on, the capacitor 104 is charged through the resistor 102 and after a time delay determined by the RC time constant, the voltage at the base of the transistor 108 increases to turn on the transistor 108, pulling its collector potential to a low value and turning off the multivibrator to place the flasher circuit in stand-by condition. Thus the self-check function terminates.

When low tire pressure is detected at one of the trailer wheels, the corresponding reed switch 20 closes so that the positive voltage from line 84 is applied through the resistors 90 and 92 to the base of the transistor 96 turning on that transistor to quickly discharge the capacitor 104 through the resistor 100. As a result, the transistor 108 is turned off and the multivibrator is turned on to cause flashing of the marker lamps. Even though the switch 20 periodically opens and closes as the wheel rotates, the flasher operation continues since the time delay established by resistor 102 and capacitor 104 does not allow the transistor 108 to conduct when the switch 20 is open for short periods. Thus the flashing rate is not interrupted, even during relatively slow wheel rotation. If, however, the vehicle comes to a stop and switch 20 remains open, the time delay circuit will time out to turn off the multivibrator. In the event it is desired to flash the marker lamps 38 by manually opening and closing the marker switch 31, the capacitor 104 will tend to discharge through the base emitter circuit of transistor 108, however, the resistor 106 limis the discharge rate to a low value. Accordingly, rapid manual flashing can occur without fully discharging the capacitor 104 and activating the self-check function.

Thus the time delay circuit has one rate for charging the capacitor 104 through the resistor 102, a second rate for discharging the capacitor through resistor 106, and still another rate for discharging through resistor 100. That time delay circuit then has the three fold function of maintaining flashing during wheel rotation, self-check upon initial turn on, and temporarily disabling the self-check during manual flashing of the marker lamps.

It is important that the flash rate of the multivibrator be slow enough to substantially cool the marker lamps 38 during each off period. This allows the production of a large current spike each time the lamps are turned on. It is well known that the lamp filaments have a low resistance when cool and thereby draw a large current, and as the filaments become hot, the resistance quickly rises and the current level decreases. Thus by using a low flash rate, the lamps are allowed to cool between flashes and large current spikes are produced which are easy to detect by the trailer pulse detector 32.

It will be seen then that the circuit according to this invention is compatible with standard tractor/trailer connectors and no additional wiring is necessary. Further due to the flashing marker lamps, a visual signal is available to the truck operator even in the event the tractor is not equipped with the pulse detector circuitry and low tire pressure indicator.

The embodiments of the invention in which an exclusive property or privilege is claimed are defined as follows:

1. In a tractor/trailer electrical circuit having an electrical power supply carried by the tractor and signal lamps carried by the traler, a warning circuit for indicating in the tractor an event occurring in the trailer comprising a conductive path for supplying electrical power from the power supply to energize the signal lamps, means for sensing an event occurring in the trailer and providing a corresponding event signal, means responsive to the event signal and connected to the said conductive path for repetitively opening and closing the conductive path at a low rate allowing the signal lamps to substantially cool when the path is opened and the lamps are de-energized, whereby each time the lamps are energized a large current pulse is produced in the conductive path, and means in the tractor for indicating the said event occurring in the trailer including an indicating lamp, a circuit for detecting the said large current pulses in the conductive path and means responsive to the said large pulses for energizing the indicating lamp.

2. In a tractor/traler electrical circuit having an electrical power supply carried by the tractor and marker lamps carried by the trailer and a universal electrical interconnection coupling the tractor and trailer, a warning circuit for indicating in the tractor an event occurring in the trailer comprising a conductive path passing through the electrical interconnection for supplying electrical power from the power supply to energize the signal lamps, means for sensing an event occurring in the trailer and providing a corresponding event signal, an electrical trailer flasher circuit connected to and energized by the said conductive path including multivibrator means responsive to the event signal and connected to the said conductive path for repetitively opening and closing the conductive path to the marker lamps to provide a first flashing visual signal to the tractor operator, the flashing being limited to a low rate allowing the marker lamps to substantially cool when the path is opened and the lamps are de-energized, whereby each time the lamps are energized a large current pulse is produced in the conductive path, and means in the tractor for indicating the said event occurring in the trailer including an indicating lamp, a circuit for detecting the said large current pulses in the conductive path and means responsive to the said large pulses for energizing the indicating lamp to provide a second visual signal to the tractor operator.

3. In a tractor/trailer electrical circuit having an electrical power supply carried by the tractor and signal lamps carried by the trailer, a warning circuit for indicating in the tractor an event occurring in the trailer comprising a conductive path for supplying electrical power from the power supply to energize the signal lamps, means for sensing an event occurring in the trailer and providing a corresponding event signal, means responsive to the event signal and connected to the said conductive path for repetitively opening and closing the conductive path at a low rate allowing the signal lamps to substantially cool when the path is opened and the lamps are de-energized, whereby each time the lamps are energized a large current pulse is produced in the conductive path, and means in the tractor for indicating the said event occurring in the trailer including an indicating lamp, a circuit for detecting the said large current pulses in the conductive path comprising a step-up transformer having a primary winding energized by the said large current pulses and a secondary winding for producing corresponding high voltage pulses, a detector circuit connected to the secondary winding and responsive to each of high voltage pulses for generating a trigger signal, and a one-shot multivibrator responsive to each such trigger signal for energizing the indicator lamp for a preset period such that the indicator lamp is energized each time the signal lamps are energized.

* * * * *

UNITED STATES PATENT AND TRADEMARK OFFICE
CERTIFICATE OF CORRECTION

PATENT NO. : 4,065,751
DATED : December 27, 1977
INVENTOR(S) : John A. Stewart et al It is certified that error appears in the above–identified patent and that said Letters Patent are hereby corrected as shown below:

Column 1, line 16, "reqire" should read -- require --.

Column 3, line 53, "wa," should read -- way, --.

Column 4, line 65, "limis" should read -- limits --.

Column 5, claim 1, line 33, "traler" should read -- trailer --.

Column 5, claim 2, line 56, "tractor/traler" should read -- tractor/trailer --.

Signed and Sealed this

Twenty-third Day of May 1978

[SEAL]

Attest:

RUTH C. MASON
*Attesting Officer*

LUTRELLE F. PARKER
*Acting Commissioner of Patents and Trademarks*